Figure 3:
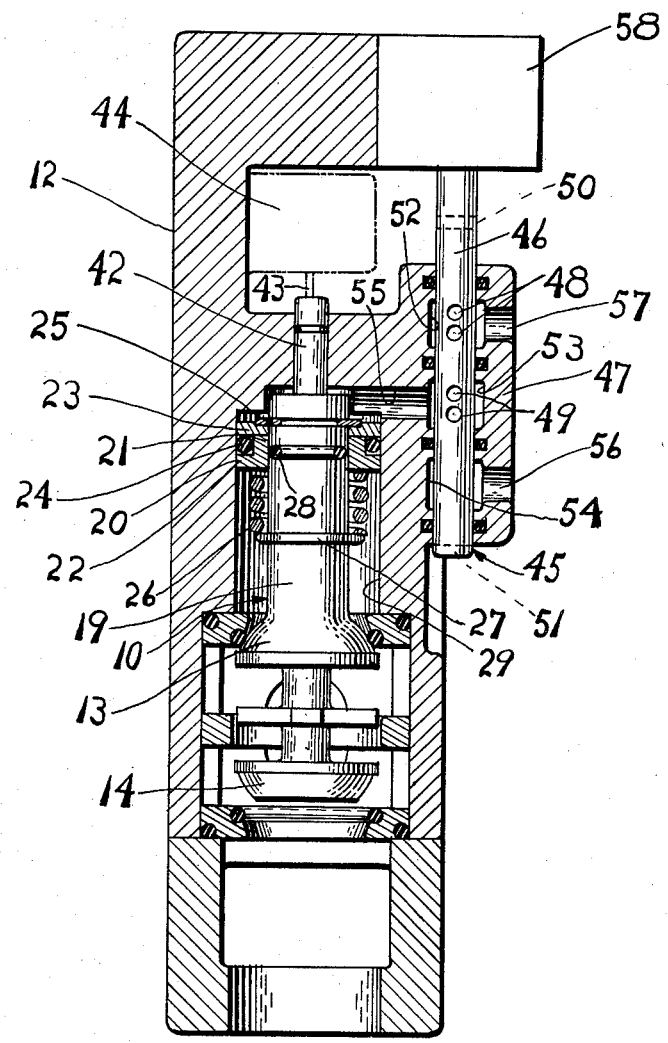

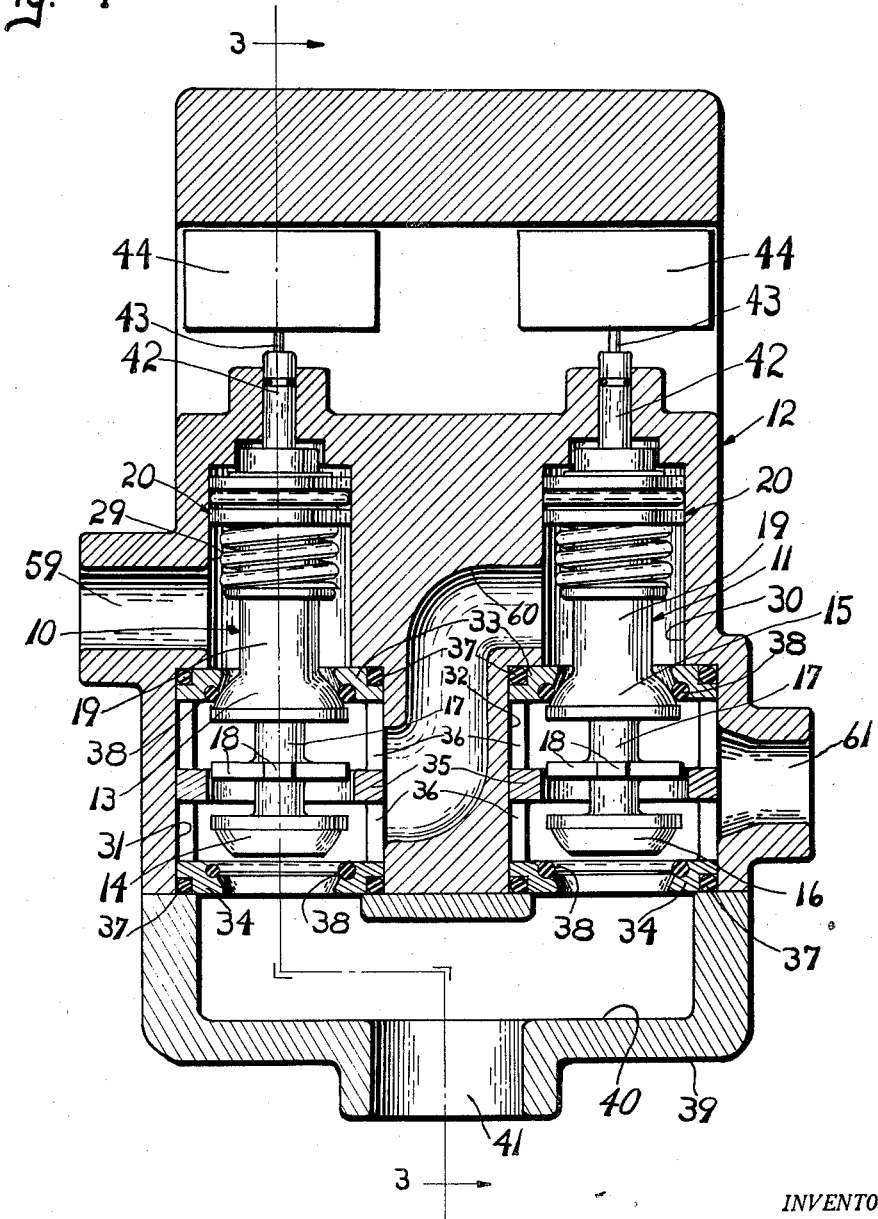

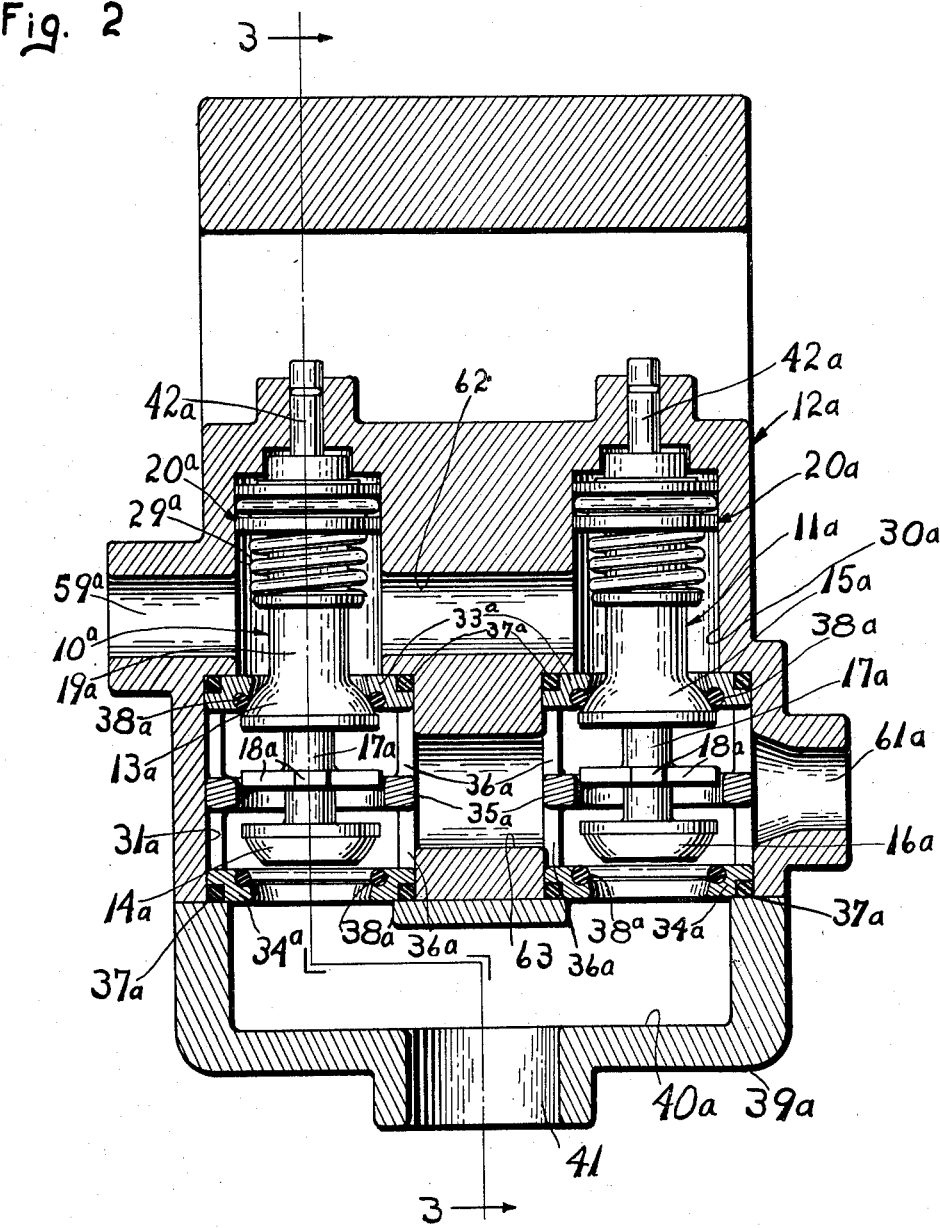

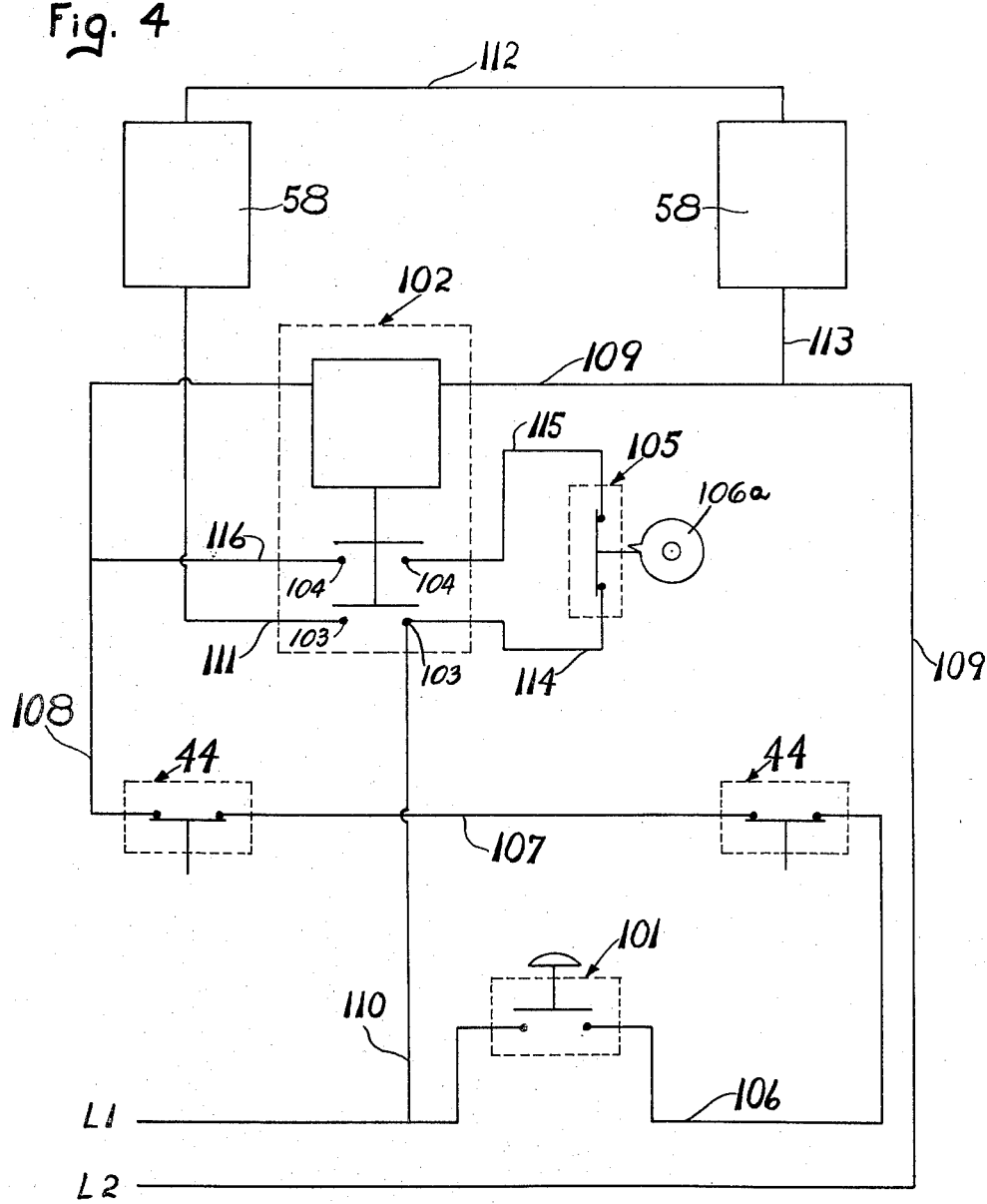

Oct. 13, 1959  N. C. HUNT  2,908,291
FLUID CONTROL VALVE
Filed April 20, 1953  4 Sheets-Sheet 4

INVENTOR.
NATHAN C. HUNT
BY
Michael Williams
Attorney

United States Patent Office 2,908,291
Patented Oct. 13, 1959

2,908,291

FLUID CONTROL VALVE

Nathan C. Hunt, Salem, Ohio, assignor to Hunt Valve Company, Salem, Ohio, a corporation of Ohio Application April 20, 1953, Serial No. 349,595

3 Claims. (Cl. 137—622)

My invention relates to a device for controlling operation of fluid actuated apparatus, more particularly to a valve for controlling apparatus such as a fluid actuated press or the like, and the principal object of my invention is to provide new and improved devices of the character described.

In the past, many different types of valves have been employed to control operation of fluid actuated apparatus. However, and particularly with respect to fluid actuated presses and the like, these valves have not been satisfactory from a safety viewpoint.

In the operation of apparatus such as a press, it is often desirable to limit the press to single-stroke operation. Many prior art valves satisfactorily limited the press to such single-stroke action as long as the valve was operating properly. However, prior art valves would occasionally stick in one position and continue to operate the press through repeated cycles. It will be appreciated that an unexpected repetition of the press cycle can damage the material being worked, the dies operated by the press, and may result in very serious injury to the operator of the press.

My invention provides a valve that will greatly reduce the possibility of unexpected repetition of the press cycle due to faulty valve operation. Furthermore, my invention provides a relatively simple valve that is positive in operation because I have eliminated the heavily loaded springs that are employed in many prior art valves. These and other advantages will become apparent from a study of the following description and of the drawings appended hereto.

In the drawings accompanying this specification and forming a part of this application there is shown, for purpose of illustration, two embodiments which my invention may assume, and in these drawings:

Figure 1 is a sectional view of a valve illustrating an embodiment of my invention, Figure 2 is a view similar to Figure 1 of a valve illustrating another embodiment of my invention, Figure 3 is a sectional view generally corresponding to the line 3—3 of Figures 1 and 2 and disclosing parts common to both embodiments in full lines, and Figure 4 is a diagram of an electrical circuit which may be used with the embodiment of the invention disclosed in Figure 1.

As shown in Figure 1, my invention comprises a pair of valve members 10 and 11 disposed in side-by-side relation within a single valve body 12. It is to be understood however that the valve members 10, 11 have been disposed in side-by-side relation within a single valve body for convenience only and, if desired, the valve members 10, 11 may be carried by separate valve bodies connected together by conduits in a manner to be disclosed.

As illustrated, valve member 10 comprises a pair of spaced-apart valve heads 13, 14 and valve member 11 comprises a pair of spaced-apart valve heads 15, 16. Respective heads of each valve member are adapted to be coaxially connected together to form a unitary structure by means of a reduced diameter shank portion 17 that extends therebetween as shown. A plurality of spoke-like members 18 are disposed between respective pairs of valve heads, the members 18 extending radially from respective portions 17 for a purpose later to be disclosed.

A stem 19 extends from each of the valve heads 13, 15 and each stem is adapted to support a piston 20. Each piston 20 comprises an annular member 21 having a flange 22 extending radially therefrom and a washer-like member 23 adapted to abut the member 21. As illustrated, the members 21, 23 together provide a piston having an annular groove adapted to receive an O-ring 24.

The means presently employed to hold each piston 20 in assembled relation with its respective stem 19 comprises a split lock-ring 25 which seats in an annular groove provided in a respective stem 19 and in a counterbore formed in the adjoining face of a respective member 23. Each piston 20 is adapted to be urged to seating engagement with its lock ring 25 by means of a spring 26 interposed between respective pistons and respective shoulders 27 provided by each stem 19. An O-ring 28 is disposed in an annular groove formed in each of the stems 19 and each O-ring 28 is engageable with a respective piston 20 to prevent fluid leakage between the pistons and respective stems 19.

As illustrated, piston 20 carried by valve member 10 is slideable in a bore 29 formed in the valve body 12 and piston 20 carried by valve member 11 is slideable in a bore 30 also formed in the valve body. A valve chamber 31 is formed in the body 12 adjacent to and co-axial with bore 29 and a valve chamber 32 is also formed in the body 12 adjacent to and co-axial with bore 30.

Each chamber 31, 32 is adapted to receive a pair of ring-like seat members 33, 34 spaced apart by means of an annular guide ring 35 having a plurality of peripherally disposed, axially extending legs 36. Each seat member 33, 34 is provided with an outer O-ring 37 that prevents fluid leakage therearound and each seat member 33, 34 is provided with an inner O-ring 38 that is adapted for engagement with a respective adjoining valve head in fluid-tight seating relation.

A cap 39 is adapted to be secured to the valve body 12 adjacent the valve chambers 31, 32 in any suitable manner, the cap 39 being provided with an interior chamber 40 that places the valve chambers 31, 32 in communication with each other as shown.

In the present embodiment, the chamber 40 is vented to the atmosphere at 41; however, if desired, the exhaust 41 could be connected to a conduit so that the fluid controlled by the valve could be recirculated.

It will be noted that valve heads 13, 14, 15 and 16 are provided with semi-spherical faces adapted for engagement with respective inner O-rings 38 so that a tight seal will be established between the valve heads and their respective seats even though the valve members become slightly misaligned. Excessive misalignment of the valve members 10, 11 is prevented by interengagement of the previously mentioned members 18 with respective guide rings 35.

In the embodiment of the invention shown in Figures 1 and 3, each stem 19 has an axially extending, reduced diameter portion 42 which is adapted to engage with the actuating plunger 43 of a respective switch mechanism 44 (shown in dot-dash lines in Figure 3) that is secured to the valve body 12. Each switch mechanism 44 is similar and each is a commercially available device having means for making and breaking an electric circuit in response to movement of the pin 43.

A solenoid operated pilot valve 45 is presently employed to shift each of the valve members 10, 11 and the respective valve heads carried thereby to and from seating engagement with respective seat-forming O-rings 38. It is to be understood that a pilot valve 45 is provided for each valve member 10, 11; however, since pilot valves 45 are similar, only one will be described in detail.

As shown in Figure 3, the pilot valve 45 comprises an elongated tubular member 46 which extends through and is slideable within a boss 47 formed on the valve body 12. The tubular member 46 has spaced-apart sets of apertures 48, 49 formed in the wall thereof and the interior of the member 46 is plugged at 50 and 51 for a purpose that will become clear.

The boss 47 is provided with a plurality of spaced-apart chambers 52, 53 and 54 which are formed by annular grooves disposed co-axially with respect to the member 46. O-ring seals are disposed adjacent each of the chambers 52, 53 and 54 for an obvious reason. A conduit 55 connects the chamber 53 to the portion of the bore 29 above the piston 20. The chamber 54 is connected to a source of fluid pressure through an inlet port 56, and the chamber 52 is presently vented to the atmosphere through an exhaust port 57.

The tubular member 46 is adapted to be shifted by energization of a solenoid 58 from the position shown wherein sets of apertures 48, 49 are in register with respective chambers 52, 53, to a position wherein sets of apertures 48, 49 are in register with chambers 53, 54 respectively. Return movement of the member 46 to the position shown may be effected by any suitable means, for example such as by a spring (not shown) which may be employed to return the member 46 when the solenoid 58 is de-energized.

As shown in Figure 1, an inlet port 59 is employed to establish communication between a source of fluid pressure and the bore 29, a conduit 60 establishes communication between the valve chamber 31 and the bore 30, and an outlet port 61 may be employed to connect the valve chamber 32 with the press or other apparatus that is to be controlled by my invention.

An electrical control circuit for the embodiment of the invention thus far described is shown in Figure 4. As illustrated, the control circuit comprises the switches 44 and the solenoids 58, a starting switch 101, a solenoid contactor 102 having contact points 103 and 104, and a switch 105 adapted to be operated by means of a cam 106a or other suitable mechanism when the press has completed one cycle of operation.

When it is desired to effect operation of the press controlled by the embodiment of my invention hereinbefore described, an operator will momentarily close the starting switch 101. Current will then flow from L1 through the switch 101 and to one of the switches 44 through conduit 106. Since both switches 44 are being held in closed position by engagement with respective valves 10, 11 that are normally in the position shown in Figure 1, current will flow through both switches 44 via conduits 107 and 108 to the solenoid of the contactor 102. The circuit will be completed to L2 through the solenoid of the contactor 102 by means of a conduit 109.

Completion of an electrical circuit through the solenoid of the contactor 102 will energize this solenoid and cause the points 103, 104 to be closed. The closed points 103 will complete a circuit from L1 to L2 through the solenoids 58 via conduits 110, 111, 112, 113 and 109. The closed points 104 will complete a holding circuit through the contactor solenoid from L1 to L2 via conduits 110 and 114, through the normally closed cam switch 105, conduits 115 and 116 and then through the contactor solenoid as before described. It will be apparent that this holding circuit by-passes the switches 44 and thus maintains current flow through the contactor solenoid. The contactor therefore maintains energization of the solenoids 58 even though the switches 44 are opened in a manner to be described.

Energization of each solenoid 58 by completion of the electrical circuit therethrough will cause movement of a respective pilot valve member 46 to a position wherein pilot inlets 56 are in communication with respective bores 29 and 30 through the hollow interior of the respective tubular members (see Figures 1 and 3). This will permit fluid pressure to act upon each piston 20 to thus shift valve members 10 and 11 from the position shown to a position wherein valve heads 13, 15 are spaced from their seats and valve heads 14, 16 are engaged with their seats. This will open the switches 44; however, the previously described holding circuit will prevent de-energization of the solenoids 58.

It will be apparent that fluid under pressure will now flow from port 59 and bore 29 to chamber 31; from chamber 31 to bore 30 through conduit 60; and from bore 30 to chamber 32 and thence to outlet port 61 and to the press. It will also be apparent that since valve heads 14, 16 are seated, fluid cannot escape through the exhaust port 41.

At the conclusion of one press cycle, the switch 105 will momentarily be opened by means of a cam or other device. This will break the holding circuit to the contactor solenoid and permit the contactor to return to the de-energized position shown in Figure 4. When the contactor 105 returns to the position shown it will de-energize the solenoids 58 and this will cause pilot members 46 to be returned to the position shown in Figure 1 in the manner previously described. The return of pilot members 46 to the position shown will exhaust the fluid pressure above pistons 20 and each piston will then be shifted to the position shown in Figure 1 in the following manner:

Piston 20 of valve member 10 will be returned to the position shown in Figure 1 since the lower portion of bore 29 is subjected to fluid pressure from inlet port 59. Piston 20 of valve member 11 will be returned to the position shown in Figure 1 because of the fluid pressure that exists in the lower portion of bore 30, conduit 60 and chamber 32. It will be clear that the return of valve members 10 and 11 to the position shown in Figure 1 will permit fluid pressure at outlet port 61 to be exhausted through port 41 and this will cause the press to stop.

It is to be understood that both valve members 10 and 11 must be shifted from the position shown in Figure 1 before fluid under pressure will flow to the outlet port 61 and thence to the press to effect operation thereof. It is also to be understood that in the event a malfunction occurs and either one of the valve members 10, 11 fails to return to the position shown in Figure 1, pressure at outlet port 61 will still be exhausted through the valve that has returned and repeat operation of the press will be prevented.

Furthermore, in the event either one of the valve members 10, 11 fails to return to the position shown in Figure 1, subsequent energization of the solenoids 58 and further operation of the press will be prevented since the switch 44 that is operated by the valve member that has failed to return will have its pin 43 in outward position.

With the pin 43 of a switch 44 in outward position, the contacts of the switch will remain open and the starting switch 101 will therefore be unable to complete an electrical circuit to the contactor 102 so as to energize the solenoids 58. It will now be clear that in the event a malfunction does occur in my valve mechanism, the press operated thereby will be rendered inoperative until the valve has been repaired.

Figure 2 illustrates another embodiment of my invention which eliminates the use of switches 44 and the associated control mechanism. As will be seen, this valve is similar to the embodiment shown in Figure 1 and like parts have therefore been given like reference numbers but with the suffix "a" added.

As clearly shown in Figure 2, a conduit 62 connects bore 29a with bore 30a and a conduit 63 connects valve chamber 31a with valve chamber 32a. This construction therefore interconnects the bore and chamber of valve member 10a and the bore and chamber of valve member 11a in parallel relation in contrast to the series relation construction of the embodiment shown in Figure 1.

Operation of the embodiment shown in Figure 2 is as follows: When it is desired to effect operation of the press controlled by this embodiment, it is only necessary for an operator to close a switch (not shown) that will energize the solenoids that shift the pilot valves.

Energization of the solenoids will cause each of the valve members 10a, 11a to shift in a manner that will be clear, from the position shown in Figure 2 to a position wherein valve heads 14a, 16a are seated against their respective seats. This will permit fluid under pressure to pass from the inlet port 59a through the bore 29a to the bore 30a by means of the conduit 62, and from each of the bores past respective valve heads 13a, 15a to respective chambers 31a, 32a. Fluid may then pass from chamber 31a to chamber 32a through conduit 63, and from chamber 32a to effect operation of the press through outlet port 61a.

When current to the solenoids is interrupted, the pilot valve mechanism will exhaust the pressure above each of the pistons 20a and fluid pressure below the pistons will therefore return each valve member 10a, 11a to the position shown in Figure 2 to connect port 61a to exhaust and thus stop the press.

It will be noted that in the event one valve member fails to return to its initial position shown, operation of the press will still be interrupted because outlet port 61a will be in communication with exhaust port 41a through the valve member that has returned to its initial position. It will further be noted that while the inlet port 59a will continue to communicate with the outlet port 61a through the valve member that has failed to return to its initial position, the valve member that has returned also connects inlet port 59a to exhaust port 41a. Since exhaust port 41a is larger than outlet port 61a, inlet pressure will thus be exhausted immediately together with any pressure that exists at outlet port 61a.

While no provision has been made in the embodiment of the invention shown in Figure 2 to prevent the operator from initiating another cycle of the press in the event one of the valve members 10a, 11a fails to operate properly, it will be apparent that switches 44, similar to those employed in the embodiment shown in Figure 1 and the associated control mechanism shown in Figure 4 could be employed. However, since the device illustrated in Figure 2 will continually exhaust inlet pressure if one of the valve members fails to return to its initial position, it is believed that this should prove to be sufficient warning to the operator that a valve malfunction exists.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only, and that my invention is not limited thereto.

I claim:

1. A device for operating a fluid actuated press or the like by controlling flow of pressurized fluid thereto, comprising valve body means having a pair of cylinder bores and a piston reciprocable within each bore, said valve body means also having a pair of valve chambers and a valve member having a pair of axially spaced heads disposed in each chamber and reciprocable by a respective piston between first and second positions to control flow of fluid through respective chambers, each of said chambers having an inlet port intermediate its valve member piston and a respective valve member head most closely adjacent such piston, an exhaust port adjacent a respective other valve member head, and an outlet port intermediate respective valve member heads, the inlet port of one of said chambers being adapted to be connected to a source of fluid under pressure and the outlet port of the other chamber being adapted to be connected to the press being controlled, each valve member in its respective first position closing its exhaust port and establishing communication between its inlet port and its outlet port and each valve member in its second position closing its inlet port and establishing communication between its outlet port and its exhaust port, conduit means connecting the outlet port of said one chamber with the inlet port of said other chamber, a solenoid for each of said valve members and each being adapted to effect movement of its related valve member from said second position to said first position upon energization, a switch responsive to the position of each valve member and each switch being adapted to pass current when its related valve member is in said second position, a first electrical circuit comprising said switches and said solenoids and adapted to pass current to initially energize said solenoids, a second electrical circuit adapted to be completed by current flow in said first circuit, said second circuit by-passing said switches and holding said solenoids energized, and means for interrupting said second circuit at a predetermined time.

2. A safety device for a fluid pressure actuated mechanism, comprising valve body means having a pair of spaced-apart bores, a piston movable axially in each of said bores between two positions and having a pair of valve heads movable therewith within respective bores, a pair of axially spaced facing valve seats in each of said bores, said bores each having an inlet port disposed between a said piston and the adjacent valve seat and an exhaust port communicating with the other valve seat and an outlet port disposed intermediate said seats, one of said inlet ports communicating with a source of fluid pressure and one of said outlet ports communicating with said mechanism, said pairs of valve heads in one position respectively engaging with one seat of respective seat pairs to close said exhaust ports and disengaging from the other seat of respective seat pairs to establish communication between said inlet ports through one of said outlet ports and thence with said mechanism through said other outlet port and said pairs of valve heads in another position respectively engaging with said other seat of respective seat pairs to close said inlet ports and disengaging from said one seat of respective seat pairs to establish communication between said outlet ports and said exhaust ports, and conduit means connecting the outlet port of one of said bores to the inlet port of the other bore.

3. The construction defined in claim 2 and further comprising a pair of solenoids for effecting movement of a respective piston and its related pair of valve heads to said one position from said other position upon energization, a pair of switches responsive to the position of a respective pair of valve heads and each passing current when its related valve head pair is in said other position, a first electrical circuit comprising said switches and said solenoids and passing current to the latter to initially effect energization thereof, a second electrical circuit completed by current flow in said first circuit, said second circuit by-passing said switches and holding said solenoids energized, and means for interrupting said second circuit at a predetermined time.

(References on following page)

References Cited in the file of this patent

UNITED STATES PATENTS

| | | |
|---|---|---|
| 412,327 | Gibson | Oct. 8, 1889 |
| 446,836 | Matthews | Feb. 17, 1891 |
| 764,240 | Hinman | July 5, 1904 |
| 1,644,714 | Eisenhauer | Oct. 11, 1927 |
| 1,819,641 | Davis | Aug. 18, 1931 |
| 1,930,557 | Hughes | Oct. 17, 1933 |
| 2,105,253 | Malott | Jan. 11, 1938 |
| 2,200,416 | Daniels | May 14, 1940 |
| 2,314,398 | Hoch | Mar. 23, 1943 |
| 2,380,677 | Schjolin | July 31, 1945 |
| 2,393,805 | Parker | Jan. 29, 1946 |
| 2,598,907 | Griffin | June 3, 1952 |
| 2,618,931 | Cantley | Nov. 25, 1952 |
| 2,632,341 | Arp | Mar. 24, 1953 |
| 2,636,581 | Bitler | Apr. 28, 1953 |
| 2,637,341 | Borst | May 5, 1953 |
| 2,754,840 | Hicks | July 17, 1956 |